United States Patent
Aruga

(10) Patent No.: US 12,062,072 B2
(45) Date of Patent: Aug. 13, 2024

(54) INFORMATION PROCESSING APPARATUS, INFORMATION PROCESSING SYSTEM, AND INFORMATION PROCESSING METHOD

(71) Applicant: Ryoh Aruga, Kanagawa (JP)

(72) Inventor: Ryoh Aruga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 211 days.

(21) Appl. No.: 17/570,394

(22) Filed: Jan. 7, 2022

(65) Prior Publication Data

US 2022/0301026 A1   Sep. 22, 2022

(30) Foreign Application Priority Data

Mar. 19, 2021   (JP) .................................. 2021-046493

(51) Int. Cl.
  *G06Q 30/04*   (2012.01)
  *G06F 3/14*   (2006.01)
  *G06F 40/174*   (2020.01)

(52) U.S. Cl.
  CPC .............. *G06Q 30/04* (2013.01); *G06F 3/14* (2013.01); *G06F 40/174* (2020.01)

(58) Field of Classification Search
  CPC ......... G06Q 30/04; G06F 3/14; G06F 40/174; G06F 3/147; G09G 2370/022; G09G 2370/027
  USPC ........................................................... 705/34
  See application file for complete search history.

(56) References Cited

U.S. PATENT DOCUMENTS

| | | | |
|---|---|---|---|
| 11,182,849 B1 * | 11/2021 | Alphin | G06Q 20/351 |
| 2019/0065456 A1 * | 2/2019 | Platow | G06F 3/04895 |
| 2020/0026752 A1 | 1/2020 | Ishikura et al. | |
| 2021/0124973 A1 | 4/2021 | Aruga et al. | |
| 2021/0150493 A1 * | 5/2021 | Teshima | G06Q 20/14 |

FOREIGN PATENT DOCUMENTS

| | | |
|---|---|---|
| JP | 2012-014612 | 1/2012 |
| JP | 2016-139183 | 8/2016 |
| JP | 2021-060801 | 4/2021 |

* cited by examiner

*Primary Examiner* — Garcia Ade
(74) *Attorney, Agent, or Firm* — XSENSUS LLP

(57) ABSTRACT

An information processing apparatus includes circuitry. The circuitry registers a plurality of forms issued to a particular party and an address for displaying the plurality of forms in a list. The plurality of forms and the address are registered in association with each other. The circuitry further causes a display to display the plurality of forms in the list in response to access to the address through an operation performed by a user of the particular party.

15 Claims, 20 Drawing Sheets

| TENANT NAME (COMPANY NAME) | USER ID | PASSWORD | ELECTRONIC MAIL ADDRESS | ... |
|---|---|---|---|---|
| CORPORATION A | User01 | ******** | aaa@xx.jp | ... |
| | User02 | ******** | bbb@xx.jp | ... |
| B CORPORATION | User11 | ******** | aaaaa@yy.com | ... |
| | User12 | ******** | bbbbb@yy.com | ... |
| | User13 | ******** | ccccc@yy.com | ... |
| C STORE | User16 | ******** | aaa@zz.com | ... |

| TENANT NAME: C STORE | | | |
|---|---|---|---|
| TENANT NAME: B CORPORATION | | | |
| TENANT NAME (COMPANY NAME) | ELECTRONIC MAIL ADDRESS | CONTACT PERSON | |
| CORPORATION A | aaa@xx.jp | ... | |
| | bbb@xx.jp | ... | |
| C STORE | ... | ... | |

FIG. 6

| TENANT NAME: B CORPORATION | | | | | | | | 250 |
|---|---|---|---|---|---|---|---|---|
| PAYER | INVOICE NUMBER | STATUS | TOTAL AMOUNT | CONSUMPTION TAX | ISSUE DATE | PAYMENT DUE DATE | FORM IMAGE PATH | |
| ... | ... | ... | ... | ... | ... | ... | ... | |
| CORPORATION A | 30125 | SENT | 55,000 | 5,000 | 2020/09/25 | 2020/10/31 | ···/30125.pdf | |
| CORPORATION A | 30126 | SENT | 110,000 | 10,000 | 2020/09/27 | 2020/10/31 | ···/30126.pdf | |
| CORPORATION A | 30127 | SENT | 1,980,000 | 180,000 | 2020/09/29 | 2020/10/31 | ···/30127.pdf | |

| DESCRIPTION INFORMATION | | | | | | | | | | | | |
|---|---|---|---|---|---|---|---|---|---|---|---|---|
| DESCRIPTION INFORMATION D1 | | | | DESCRIPTION INFORMATION D2 | | | | DESCRIPTION INFORMATION D3 | | | | NOTES |
| ARTICLE CODE | ARTICLE NAME | QUANTITY | UNIT PRICE | PRICE | ARTICLE CODE | ARTICLE NAME | QUANTITY | UNIT PRICE | PRICE | | | |
| ... | ... | ... | ... | ... | ... | ... | ... | ... | ... | ... | ... | ... |
| 20783 | SHREDDER | 2 | 25,000 | 50,000 | — | — | — | — | — | ... | ... | ... |
| 41523 | WHITEBOARD | 5 | 20,000 | 100,000 | — | — | — | — | — | ... | ... | ... |
| 41523 | WHITEBOARD | 5 | 20,000 | 100,000 | 10855 | RECEPTION TABLE | 10 | 50,000 | 500,000 | — | — | — |

| LIST SCREEN ADDRESS | STATUS | PAYER | BILLER | INVOICE NUMBER |
|---|---|---|---|---|
| https:・・・//yyxx | VALID | CORPORATION A | B CORPORATION | 30125 |
|  |  |  |  | 30126 |
| https:・・・//yyyxxx | VALID | CORPORATION C | C STORE | 30127 |
|  |  |  |  | ... |

260-2

| VALID PERIOD OF LIST SCREEN ADDRESS |
|---|
| UNTIL END OF MONTH TWO MONTHS AFTER ISSUE DATE |

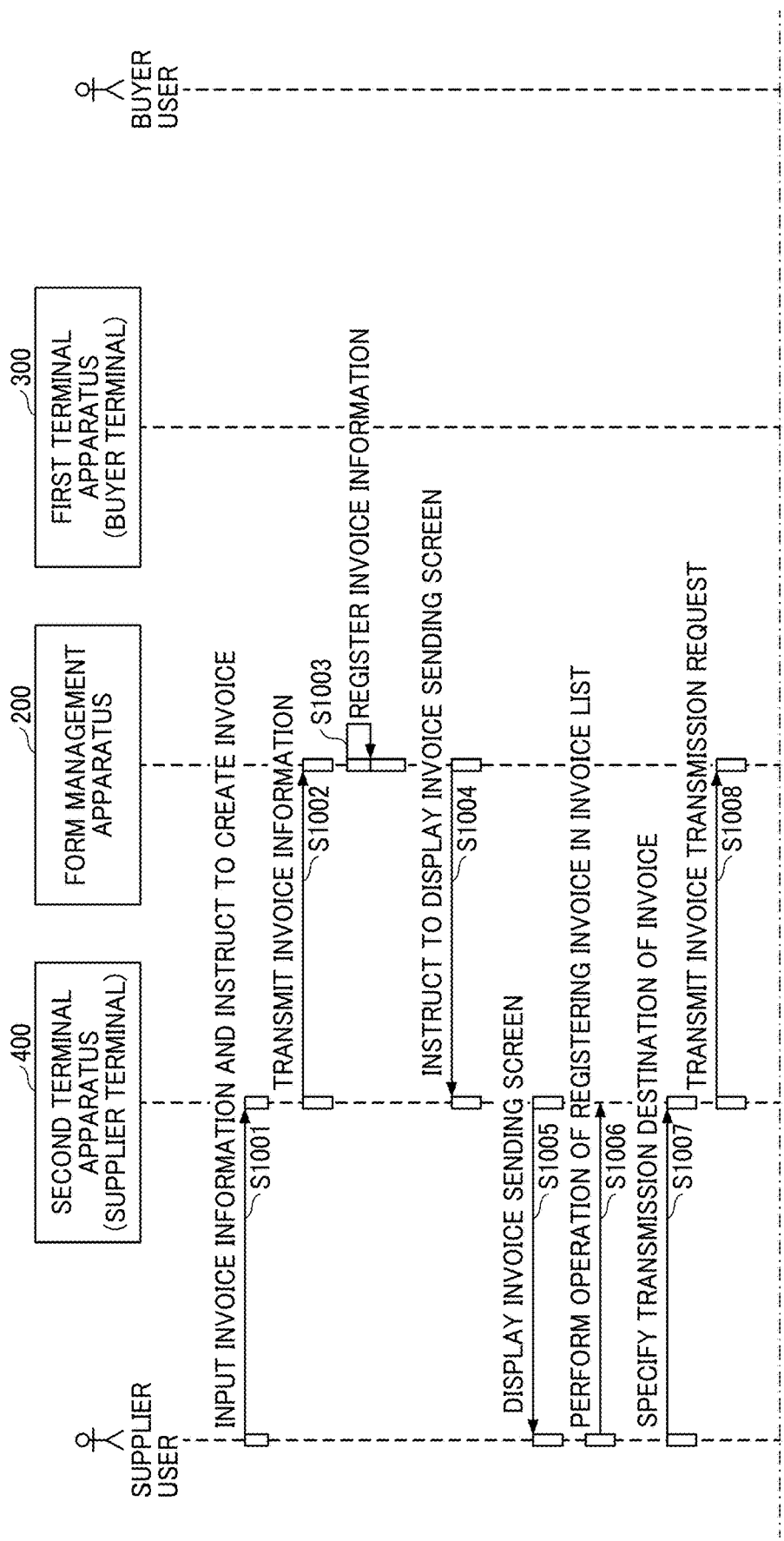

FIG. 13

CREATE INVOICE

INVOICE NUMBER 30127
PAYER CORPORATION A
TOTAL AMOUNT 1,980,000
PAYMENT DUE DATE 2020 YEAR 10 MONTH 31 DAY    CURRENCY ▼JPY – YEN

| | ARTICLE CODE | ARTICLE NAME | QUANTITY | UNIT PRICE | PRICE |
|---|---|---|---|---|---|
| DESCRIPTION D1 | ▶41523 | WHITEBOARD | 5 | 20,000 | 100,000 |
| DESCRIPTION D2 | ▶10855 | RECEPTION TABLE | 10 | 50,000 | 500,000 |
| DESCRIPTION D3 | ▶00562 | CHAIR | 60 | 20,000 | 1,200,000 |

SUBTOTAL 1,800,000
CONSUMPTION TAX 180,000
TOTAL AMOUNT 1,980,000

NOTES

PAYEE  B CORP, SAVING 1111111, aa BRANCH, AAA BANK

CANCEL    CREATE

FIG. 14

SEND INVOICE — 140

PLEASE SELECT THE TRANSMISSION DESTINATION.

- ☑ aaa@xx.jp
- ☐ bbb@xx.jp

— 141

INVOICE — 142

CORPORATION A
XXXXX, TOKYO 000-0000

| ORDER NUMBER | 2020-0010 |
|---|---|
| ISSUE DATE | SEPTEMBER 29, 2020 |
| PAYMENT DUE DATE | OCTOBER 31, 2020 |

B CORPORATION
YYYYY, TOKYO 000-0000

B CORPORATION

| ARTICLE CODE | ARTICLE NAME | QUANTITY | UNIT PRICE | PRICE |
|---|---|---|---|---|
| 41523 | WHITEBOARD | 5 | 20,000 | 100,000 |
| 10855 | RECEPTION TABLE | 10 | 50,000 | 500,000 |
| 00562 | CHAIR | 60 | 20,000 | 1,200,000 |
| | | | SUBTOTAL | 1,800,000 |
| | | | CONSUMPTION TAX | 180,000 |
| | | | TOTAL AMOUNT | 1,980,000 |

TOTAL AMOUNT ¥ 1,980,000

NOTES
PAYEE  B CORP, SAVING 1111111, aa BRANCH, AAA BANK

☑ REGISTER INVOICE IN INVOICE LIST OF BUYER — 144

— 143

SUBJECT: Invoice

TEXT: Thank you for your order.
. . . . .
. . . . .
. . . . .
. . . . .
. . . . .

[CANCEL] [SEND] — 145

FIG. 16 https://•••/yyxx ~161

LIST OF INVOICES FOR SEPTEMBER

BILLER: B CORPORATION

162 { NUMBER OF INVOICES: 3
TOTAL BILLING AMOUNT: 2,035,000 YEN

[BATCH-DOWNLOAD] ~164

| BILLER | INVOICE NUMBER | TOTAL AMOUNT | CONSUMP-TION TAX | ISSUE DATE | PAYMENT DUE DATE | | | |
|---|---|---|---|---|---|---|---|---|
| B CORPORATION | 30125 | 55,000 | 5,000 | 2020/09/25 | 2020/10/31 | DISPLAY | DOWNLOAD | |
| B CORPORATION | 30126 | 110,000 | 10,000 | 2020/09/27 | 2020/10/31 | DISPLAY | DOWNLOAD | |
| B CORPORATION | 30127 | 1,870,000 | 170,000 | 2020/09/29 | 2020/10/31 | DISPLAY | DOWNLOAD | CONFIRM RECEIPT |

| TENANT NAME: C STORE | | | | |
|---|---|---|---|---|
| TENANT NAME: B CORPORATION | | | | |
| TENANT NAME (COMPANY NAME) | ELECTRONIC MAIL ADDRESS | CONTACT PERSON | UNIT OF PERIOD | |
| CORPORATION A | aaa@xx.jp | ... | MONTH | |
| | bbb@xx.jp | ... | | |
| CORPORATION C | ... | ... | WEEK | |

| LIST SCREEN ADDRESS | STATUS | PAYER | BILLER | UNIT OF PERIOD | INVOICE NUMBER |
|---|---|---|---|---|---|
| https:···/yyxx | VALID | CORPORATION A | B CORPORATION | MONTH | 30125 |
| | | | | | 30126 |
| https:···/yyyxxx | VALID | CORPORATION C | C STORE | WEEK | 30127 |
| | | | | | ... |

260A-2

| UNIT OF PERIOD | VALID PERIOD OF LIST SCREEN ADDRESS |
|---|---|
| MONTH | UNTIL END OF MONTH TWO MONTHS AFTER ISSUE DATE |
| WEEK | UNTIL FRIDAY TWO WEEKS AFTER ISSUE DATE |

FIG. 19

SEND INVOICE

PLEASE SELECT THE TRANSMISSION DESTINATION.

- ☑ aaa@xx.jp
- ☐ bbb@xx.jp

INVOICE

CORPORATION A
XXXXX, TOKYO 000-0000

| ORDER NUMBER | 2020-0010 |
|---|---|
| ISSUE DATE | SEPTEMBER 29, 2020 |
| PAYMENT DUE DATE | OCTOBER 31, 2020 |

B CORPORATION
YYYYY, TOKYO 000-0000

B CORPORATION

| TOTAL AMOUNT | ¥ | 1,980,000 |
|---|---|---|

| ARTICLE CODE | ARTICLE NAME | QUANTITY | UNIT PRICE | PRICE |
|---|---|---|---|---|
| 41523 | WHITEBOARD | 5 | 20,000 | 100,000 |
| 10855 | RECEPTION TABLE | 10 | 50,000 | 500,000 |
| 00562 | CHAIR | 60 | 20,000 | 1,200,000 |
| | | | SUBTOTAL | 1,800,000 |
| | | | CONSUMPTION TAX | 180,000 |
| | | | TOTAL AMOUNT | 1,980,000 |

NOTES
PAYEE   B CORP, SAVING 1111111, aa BRANCH, AAA BANK

- ☐ REGISTER INVOICE IN WEEKLY INVOICE LIST
- ☑ REGISTER INVOICE IN MONTHLY INVOICE LIST

SUBJECT: Invoice

TEXT:
Thank you for your order.
. . . . . .
. . . . . .
. . . . . .
. . . . . .
. . . . . .

*Invoice 30126: https://yyy/bnc6aiobn9sl0lsk

[CANCEL]   [SEND]

| LIST SCREEN ADDRESS | STATUS | PAYER | BILLER | INVOICE NUMBER |
|---|---|---|---|---|
| https:・・・/yyxx | VALID | CORPORATION A | B CORPORATION | 30125 |
| | | | | 30126 |
| | | | | 30127 |
| | | | D CORPORATION | 50122 |
| | | | | 50123 |
| | | | ⋮ | |

LIST OF INVOICES FOR SEPTEMBER — 160A

| BILLER | INVOICE NUMBER | TOTAL AMOUNT | CONSUMP-TION TAX | ISSUE DATE | PAYMENT DUE DATE | | | |
|---|---|---|---|---|---|---|---|---|
| B CORPORATION | 30125 | 55,000 | 5,000 | 2020/09/25 | 2020/10/31 | DISPLAY | DOWNLOAD | |
| B CORPORATION | 30126 | 110,000 | 10,000 | 2020/09/27 | 2020/10/31 | DISPLAY | DOWNLOAD | CONFIRM RECEIPT |
| B CORPORATION | 30127 | 1,870,000 | 170,000 | 2020/09/29 | 2020/10/31 | DISPLAY | DOWNLOAD | CONFIRM RECEIPT |
| TOTAL BILLING AMOUNT 2,035,000 YEN | | | | | | | BATCH-DOWNLOAD | |
| D CORPORATION | ⋮ | ⋮ | ⋮ | ⋮ | ⋮ | DISPLAY | DOWNLOAD | CONFIRM RECEIPT |
| D CORPORATION | ⋮ | ⋮ | ⋮ | ⋮ | ⋮ | DISPLAY | DOWNLOAD | |
| TOTAL BILLING AMOUNT | | | | | | | BATCH-DOWNLOAD | |

163A

162A — NUMBER OF INVOICES: 5
TOTAL BILLING AMOUNT: 3,000,000 YEN

164A — BATCH-DOWNLOAD

INFORMATION PROCESSING APPARATUS, INFORMATION PROCESSING SYSTEM,
AND INFORMATION PROCESSING
METHOD

CROSS-REFERENCE TO RELATED
APPLICATION

This patent application is based on and claims priority pursuant to 35 U.S.C. § 119(a) to Japanese Patent Application No. 2021-046493, filed on Mar. 19, 2021, in the Japan Patent Office, the entire disclosure of which is hereby incorporated by reference herein.

BACKGROUND

Technical Field

The present invention relates to an information processing apparatus, an information processing system, and an information processing method.

Description of the Related Art

There is a technique used in sales transaction to enable a provider (i.e., supplier) of a commercial product or service to create image data of an invoice in the portable document format (PDF) file, for example, and transmit the image data to an electronic mail address of a purchaser (i.e., buyer) of the commercial product or service by attaching the image data to an electronic mail addressed to the electronic mail address.

A typical purchaser of commercial products and services processes received invoices at one time in a particular period, such as at the end of the month. According to the above-described technique, however, individual invoices are sent to the purchaser as attached to separate electronic mails, which complicates the work of consolidating the invoices received during a certain period. This issue is not limited to invoices but also occurs in other forms such as quotations, order sheets, and statements of delivery.

SUMMARY

In one embodiment of this invention, there is provided an information processing apparatus that includes, for example, circuitry. The circuitry registers a plurality of forms issued to a particular party and an address for displaying the plurality of forms in a list. The plurality of forms and the address are registered in association with each other. The circuitry further causes a display to display the plurality of forms in the list in response to access to the address through an operation performed by a user of the particular party.

In one embodiment of this invention, there is provided an information processing system that includes, for example, a first terminal apparatus, a second terminal apparatus, and an information processing apparatus. The information processing apparatus includes circuitry. The circuitry registers a plurality of forms issued in response to an operation of the second terminal apparatus and an address for displaying the plurality of forms in a list. The plurality of forms and the address are registered in association with each other. In response to access to the address through an operation of the first terminal apparatus, the circuitry instructs the first terminal apparatus to display the plurality of forms in the list. The first terminal apparatus includes a first display to display the plurality of forms in the list. The second terminal apparatus includes a second display to display a screen for creating the plurality of forms.

In one embodiment of this invention, there is provided an information processing method that includes, for example, registering a plurality of forms issued to a particular party and an address for displaying the plurality of forms in a list. The plurality of forms and the address are registered in association with each other. The information processing method further includes causing a display to display the plurality of forms in the list in response to access to the address through an operation performed by a user of the particular party.

BRIEF DESCRIPTION OF THE SEVERAL
VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a diagram illustrating an example of a tenant database included in the form management apparatus of the first embodiment;

FIG. 5 is a diagram illustrating an example of a client management database included in the form management apparatus of the first embodiment;

FIG. 6 is a diagram illustrating an example of an invoice database included in the form management apparatus of the first embodiment;

FIG. 7 is a diagram illustrating an example of a viewing management database included in the form management apparatus of the first embodiment;

FIGS. 10A and 10B are a sequence diagram illustrating an operation of the form management system of the first embodiment;

FIG. 13 is a diagram illustrating an example of an invoice creation screen of the first embodiment;

FIG. 14 is a diagram illustrating an example of an invoice sending screen of the first embodiment;

FIG. 16 is a diagram illustrating an example of an invoice list screen of the first embodiment;

FIG. 17 is a diagram illustrating an example of a client management database according to a second embodiment of the present invention;

FIG. 18 is a diagram illustrating an example of a viewing management database of the second embodiment;

FIG. 19 is a diagram illustrating an example of an invoice sending screen of the second embodiment;

FIG. 20 is a diagram illustrating an example of a viewing management database according to a third embodiment of the present invention; and FIG. 21 is a diagram illustrating an example of an invoice list screen of the third embodiment.

Figure 1:
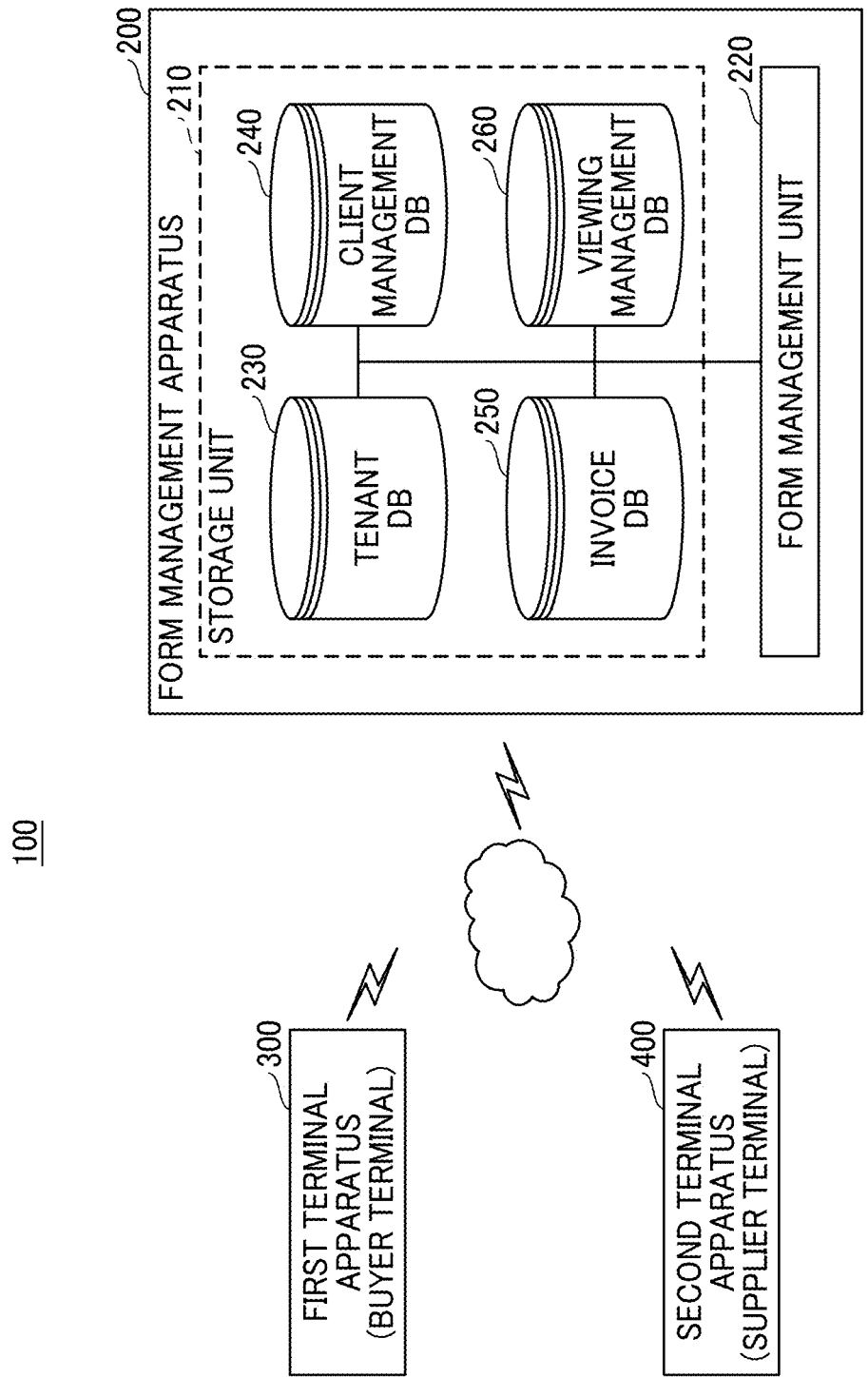
FIG. 1 is a diagram illustrating an example of the system configuration of a form management system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described below with reference to the accompanying drawings.

FIG. 1 is a diagram illustrating an example of the system configuration of a form management system according to a first embodiment of the present invention.

A form management system 100 of the first embodiment is an example of an information processing system. The form management system 100 includes a form management apparatus 200, a first terminal apparatus 300, and a second terminal apparatus 400, which are connected to each other via a network, for example.

In the form management system 100 of the first embodiment, the form management apparatus 200 manages form information exchanged between the first terminal apparatus 300 and the second terminal apparatus 400, which are used by businesses or individuals that conduct sales transactions, for example.

In the first embodiment, the first terminal apparatus 300 is a terminal apparatus mainly used by a buyer in a sales transaction, and the second terminal apparatus 400 is a terminal apparatus mainly used by a supplier in the sales transaction. In the following description, the first terminal apparatus 300 and the second terminal apparatus 400 will also be described as the buyer terminal 300 and the supplier terminal 400, respectively.

Further, in the following description, a user of a service provided by the form management system 100 of the first embodiment may be described as a tenant. That is, a tenant in the first embodiment is, for example, a business or individual acting as a supplier or buyer.

Further, in the following description, a tenant acting as a buyer (hereinafter referred to as the buyer tenant) will be described as Corporation A, and a tenant acting as a supplier (hereinafter referred to as the supplier tenant) will be described as B Corporation. Therefore, the buyer terminal 300 is managed by Corporation A, and the supplier terminal 400 is managed by B Corporation.

The form management apparatus 200 of the first embodiment is an example of an information processing apparatus. The form management apparatus 200 of the first embodiment includes a storage unit 210 (i.e., a memory) and a form management unit 220. The storage unit 210 of the first embodiment includes a tenant database (DB) 230, a client management DB 240, an invoice DB 250, and a viewing management DB 260.

The tenant DB 230 stores information of tenants. The client management DB 240 stores information of clients of the tenants.

The invoice DB 250 stores invoice information representing invoices. In the following description, the invoices will be described as an example of forms. The invoice information of the first embodiment is therefore an example of the form information. The viewing management DB 260 stores, for each of the tenants, information for enabling the tenant to view a list of forms (i.e., invoices in the present example) issued by the clients of the tenant. The forms may be quotations, order sheets, or statements of delivery, for example.

The form management unit 220 stores, in the storage unit 210, a plurality of invoices (i.e., forms) issued to a particular party and an address for displaying the invoices in a list such that the invoices and the address are registered in association with each other. Further, in response to receipt of a request from the buyer tenant, the form management unit 220 enables the buyer terminal 300 to display a list of invoices issued during a certain period.

The first embodiment therefore obviates the need for the buyer tenant to do the work of consolidating the invoices received during the certain period, improving operational convenience.

In the example of FIG. 1, the tenant DB 230, the client management DB 240, the invoice DB 250, and the viewing management DB 260 are included in the form management apparatus 200. These databases, however, are not necessarily required to be included in the form management apparatus 200. Part or all of the databases may be disposed outside the form management apparatus 200. Further, the form management unit 220 may be implemented by a plurality of information processing apparatuses.

Figure 2:
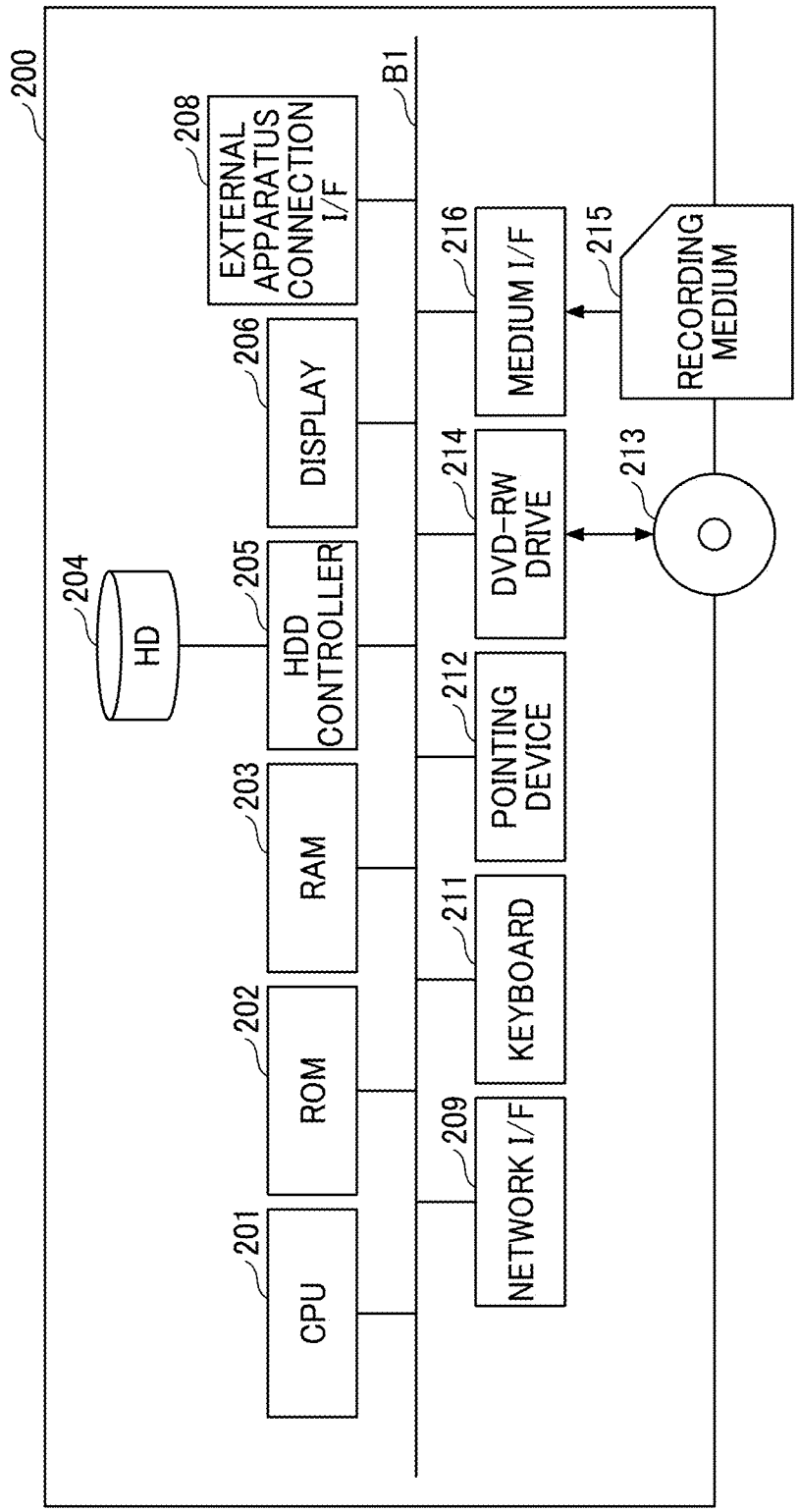
FIG. 2 is a diagram illustrating an example of the hardware configuration of a form management apparatus included in the form management system of the first embodiment.
Figure 3:
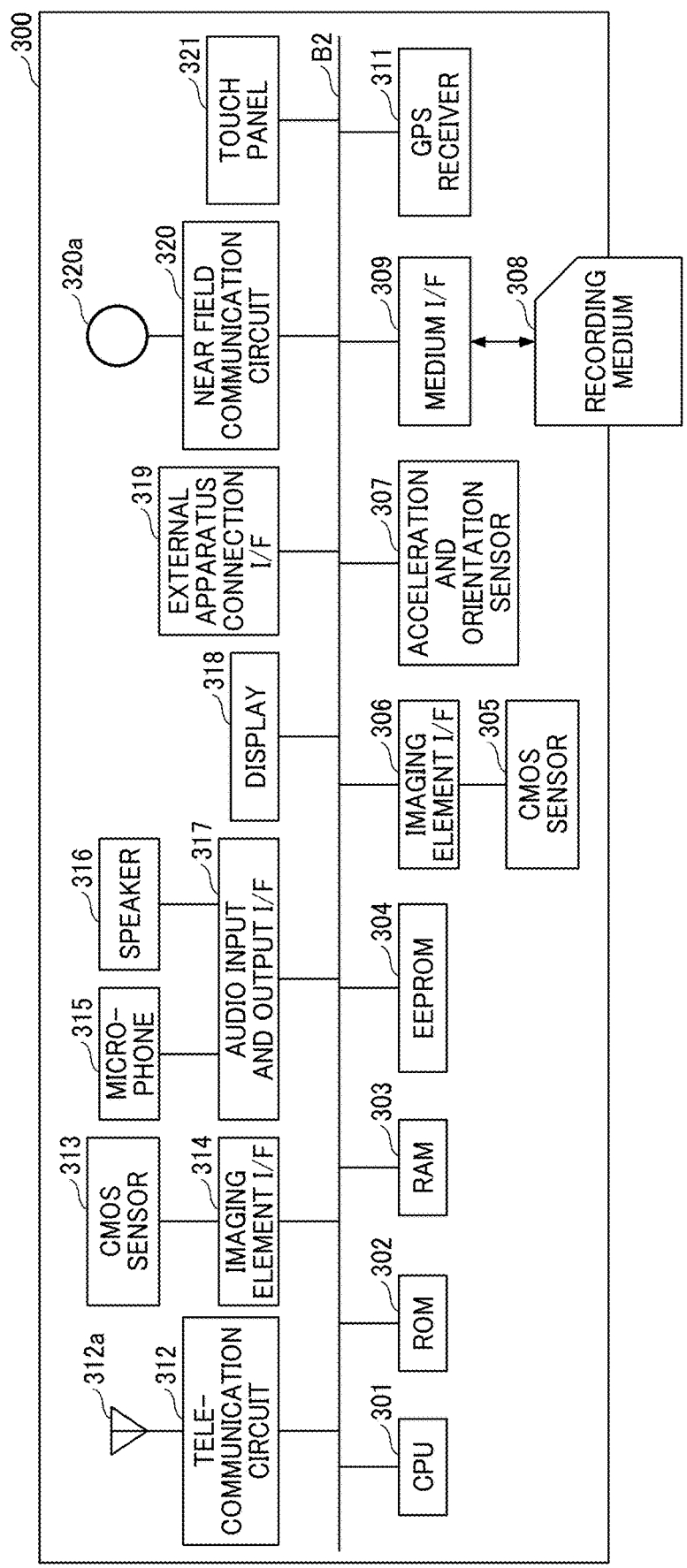
FIG. 3 is a diagram illustrating an example of the hardware configuration of a terminal apparatus included in the form management system of the first embodiment.

With reference to FIGS. 2 and 3, a description will be given of a hardware configuration of an information processing apparatus implementing the form management apparatus 200 and a hardware configuration of the first terminal apparatus 300.

FIG. 2 is a diagram illustrating an example of the hardware configuration of the form management apparatus 200 of the first embodiment. The form management apparatus 200 is implemented by a computer. As illustrated in FIG. 2, the form management apparatus 200 includes a central processing unit (CPU) 201, a read only memory (ROM) 202, a random access memory (RAM) 203, a hard disk (HD) 204, a hard disk drive (HDD) controller 205, a display 206, an external apparatus connection interface (I/F) 208, a network I/F 209, a bus line B1, a keyboard 211, a pointing device 212, a digital versatile disk-rewritable (DVD-RW) drive 214, and a medium I/F 216.

The CPU 201 controls the overall operation of the form management apparatus 200. The ROM 202 stores a program used to drive the CPU 201, such as an initial program loader (IPL). The RAM 203 is used as a work area for the CPU 201. The HD 204 stores various data of programs, for example.

The HDD controller 205 controls writing and reading of various data to and from the HD 204 under the control of the CPU 201. The display 206 displays various information such as a cursor, menus, windows, text, and images. The external apparatus connection I/F 208 is an interface for connecting the form management apparatus 200 to various external apparatuses. The external apparatuses in this case include a universal serial bus (USB) memory and a printer, for example. The network VF 209 is an interface for performing data communication via a communication network. The bus line B1 includes an address bus and a data bus for electrically connecting the CPU 201 and the other components in FIG. 2 to each other.

The keyboard 211 is an input device including a plurality of keys for inputting text, numerical values, and various instructions, for example. The pointing device 212 is an input device used to select and execute various instructions, select a processing target, and move the cursor, for example. The DVD-RW drive 214 controls writing and reading of various data to and from a DVD-RW 213 as an example of a removable recording medium. The removable recording medium is not limited to the DVD-RW, and may be a DVD-recordable (DVD-R), for example. The medium VT 216 controls writing (i.e., storage) and reading of data to and from a recording medium 215 such as a flash memory.

FIG. 3 is a diagram illustrating an example of the hardware configuration of the first terminal apparatus 300 of the first embodiment. The first terminal apparatus 300 and the second terminal apparatus 400 of the first embodiment may have a similar hardware configuration. The following description with FIG. 3 will therefore be given of a hardware configuration of the first terminal apparatus 300 as an example of the hardware configuration of the first terminal apparatus 300 and the second terminal apparatus 400.

The first terminal apparatus 300 of the first embodiment includes a CPU 301, a ROM 302, a RAM 303, an electrically erasable programmable read only memory (EEPROM) 304, a complementary metal oxide semiconductor (CMOS) sensor 305, an imaging element I/F 306, an acceleration and orientation sensor 307, a medium I/F 309, and a global positioning system (GPS) receiver 311.

The CPU 301 is an arithmetic processing device that controls the overall operation of the first terminal apparatus 300. The ROM 302 stores programs for the CPU 301 and a program used to drive the CPU 301 such as an IPL. The RAM 303 is used as a work area for the CPU 301. The EEPROM 304 writes or reads various data of a program for the terminal apparatus, for example, under the control of the CPU 301. The ROM 302, the RAM 303, and the EEPROM 304 are examples of storage devices of the first terminal apparatus 300.

The CMOS sensor 305 is a built-in imaging device that captures the image of a subject (mainly the image of a user) under the control of the CPU 301 to obtain image data. The CMOS sensor 305 may be replaced by another imaging device such as a charge coupled device (CCD) sensor.

The imaging element I/F 306 is a circuit that controls the driving of the CMOS sensor 305. The acceleration and orientation sensor 307 includes various types of sensors such as an electromagnetic compass that detects geomagnetism, a gyrocompass, and an acceleration sensor. The medium I/F 309 controls data writing (i.e., storage) and reading to and from a recording medium 308 such as a flash memory. The GPS receiver 311 receives a GPS signal from a GPS satellite.

The first terminal apparatus 300 further includes a telecommunication circuit 312, an antenna 312a for the telecommunication circuit 312, a CMOS sensor 313, an imaging element I/F 314, a microphone 315, a speaker 316, an audio input and output I/F 317, a display 318, an external apparatus connection I/F 319, a near field communication circuit 320, an antenna 320a for the near field communication circuit 320, a touch panel 321, and a bus line B2.

The telecommunication circuit 312 is a circuit that communicates with another apparatus via a communication network. The CMOS sensor 313 is a built-in imaging device that captures the image of a subject under the control of the CPU 301 to obtain image data. The imaging element I/F 314 is a circuit that controls the driving of the CMOS sensor 313. The microphone 315 is a built-in circuit that converts sound into an electrical signal. The speaker 316 is a built-in circuit that convers an electrical signal into physical vibration to produce the sound of music or voice, for example. The audio input and output I/F 317 is a circuit that processes the input of an audio signal from the microphone 315 and the output of an audio signal to the speaker 316 under the control of the CPU 301.

The display 318 is a display device such as a liquid crystal or organic electroluminescence (EL) display, for example, which displays the image of the subject and various icons, for example. The external apparatus connection O/F 319 is an interface for connecting the first terminal apparatus 300 to various external apparatuses. The near field communication circuit 320 is a communication circuit conforming to a standard such as near field communication (NFC) or Bluetooth (registered trademark). The touch panel 321 is an input device for the user to operate the first terminal apparatus 300 by pressing the display 318. The display 318 is an example of a display included in the first terminal apparatus 300. The bus line B2 includes an address bus and a data bus for electrically connecting the CPU 301 and the other components in FIG. 3 to each other.

The first terminal apparatus (i.e., buyer terminal) 300 and the second terminal apparatus (i.e., supplier terminal) 400 of the first embodiment may have a similar hardware configuration to that of the form management apparatus 200.

The databases included in the storage unit 210 of the form management apparatus 200 will be described with reference to FIGS. 4 to 7.

FIG. 4 is a diagram illustrating an example of the tenant DB 230 of the first embodiment. The tenant DB 230 of the first embodiment includes information items "tenant name (company name)," "user identifier (ID)," "password," and "electronic mail address." for example. The item "tenant name (company name)" is associated with the other items. In the tenant DB 230, information including the value of the item "tenant name (company name)" and the values of the other items may be described as tenant information.

The value of the item "tenant name (company name)." which represents the name of the tenant, is information for identifying the tenant. The values of the items "user ID" and "password" are used when the tenant logs in to the form management system 100. In the first embodiment, the value of the item "user ID" may be different between when the tenant is the buyer and when the tenant is the supplier.

The value of the item "electronic mail address" is information representing a contact address of the tenant, specifically the transmission destination of order document information or invoice information, for example.

FIG. 5 is a diagram illustrating an example of the client management DB 240 of the first embodiment. The client management DB 240 of the first embodiment may be provided for each tenant. The client management DB 240 includes information items "tenant name (company name)," "electronic mail address," and "contact person," for example.

The value of the item "tenant name (company name)" represents the tenant name (company name) of a client. The value of the item "electronic mail address" represents the electronic mail address of the client. The value of the item "contact person" represents the name of the contact person of the client.

The example of FIG. 5 indicates that the clients of a tenant "B Corporation" include "Corporation A" and "C Store," for example.

FIG. 6 is a diagram illustrating an example of the invoice DB 250 of the first embodiment. The invoice DB 250 is provided for each tenant. FIG. 6 illustrates an example of the invoice DB 250 provided for a tenant with a tenant name "B Corporation."

The invoice DB 250 of the first embodiment includes information items "payer," "invoice number," "status," "total amount," "consumption tax," "issue date," "payment due date," "form image path," and "description information," for example. In the invoice DB 250, the items "payer" and "invoice number" are associated with the other items. In the following description, information including the values of the items "payer" and "invoice number" and the values of the other items in the invoice DB 250 will be described as the invoice information.

The invoice information is created and transmitted to the form management apparatus 200 by the supplier terminal 400, and is stored in the invoice DB 250.

The value of the item "payer" represents the name of the tenant as the transmission destination of the invoice information. The value of the item "invoice number" is identification information for identifying the invoice information.

The value of the item "status" represents the status of the invoice information. When the invoice information is created and stored in the viewing management DB 260, the value of the item "status" is updated to "temporarily saved." When the transmission of the invoice information to the buyer terminal 300 from the form management apparatus 200 is completed, the value of the item "status" is updated to "sent."

The value of the item "total amount" represents the total amount included in the invoice information. The value of the item "consumption tax" represents the amount of the consumption tax on the total amount. The value of the item "issue date" represents the creation date of the invoice information (i.e., the issue date of the invoice). The value of the item "form image path" represents the storage location of image data representing the created invoice information, i.e., form image data.

The value of the item "description information" represents descriptions included in the invoice information. In the item "description information" in the example of FIG. 6, items such as "description information D1" and "description information D2" are associated with each other. The item "description information D1" includes items such as "product code," "product name," "quantity," "unit price," and "price."

FIG. 7 is a diagram illustrating an example of the viewing management DB 260 of the first embodiment. The viewing management DB 260 of the first embodiment includes a viewing management table 260-1 and a viewing period management table 260-2.

The viewing management table 260-1 includes information items "list screen address," "status," "payer," "biller," and "invoice number."

In the viewing management table 260-1, the value of the item "list screen address" is the uniform resource locator (URL) representing the storage location of list screen data representing a list of invoices for each tenant. The list screen address may be generated by the form management unit 220, for example. The value of the item "status" indicates whether the value of the item "list screen address" is valid. The value of the item "payer" represents the buyer tenant as the transmission destination of the invoice. The value of the item "biller" represents the supplier tenant as the issuer of the invoice. The value of the item "invoice number" represents the invoice number of the invoice issued to the tenant as the payer.

The viewing period management table 260-2 stores information representing the valid period of the list screen address. In the example of FIG. 7, the valid period of the list screen address is until the end of the month two months after the generation of the list screen address.

If the elapsed time after the generation of the URL as the value of the item "list screen address" is within the valid period, the item "status" in the viewing management table 260-1 of the first embodiment has a value "valid." If the elapsed time after the generation of the URL exceeds the valid period, the item "status" has a value "invalid."

Functions of the form management unit 220 of the form management apparatus 200 of the first embodiment will be described with reference to FIG. 8.

Figure 8:
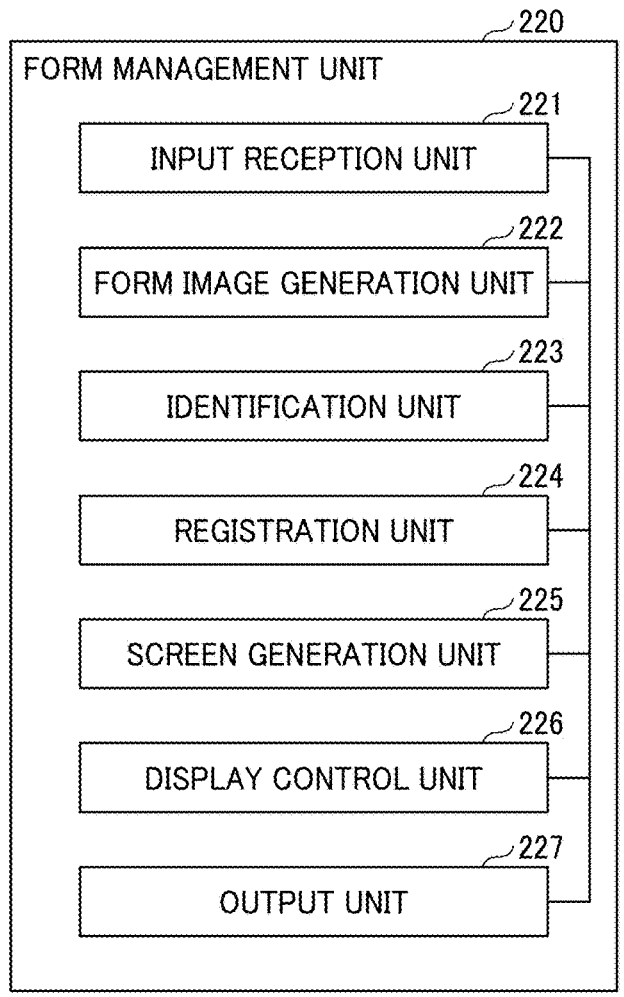
FIG. 8 is a diagram illustrating functions of a form management unit included in the form management apparatus of the first embodiment.

FIG. 8 is a diagram illustrating functions of the form management unit 220. The form management unit 220 of the first embodiment includes an input reception unit 221, a form image generation unit 222, an identification unit 223, a registration unit 224, a screen generation unit 225, a display control unit 226, and an output unit 227.

The input reception unit 221 receives a variety of inputs to the form management apparatus 200. Specifically, the input reception unit 221 receives input of the invoice information. The input reception unit 221 further receives various operations and requests input from the buyer terminal 300 and the supplier terminal 400.

Based on the invoice information input to the input reception unit 221, the form image generation unit 222 generates the form image data representing the image of the invoice.

The identification unit 223 identifies, from invoice information items stored in the invoice DA 250, an invoice information item meeting a particular condition (i.e., a preset condition).

For example, the particular condition may be that the issue date included in the invoice information item is within a certain period (i.e., a preset period). That is, the particular condition may be that that the invoice information item represents an invoice issued within the certain period (e.g., a month or week). Further, for example, the particular condition may be that the invoice information item corresponds to a particular biller (i.e., issuer).

The registration unit 224 stores the invoice information received by the input reception unit 221 into the invoice DB 250. The registration unit 224 further stores the invoice number included in the input invoice information into the viewing management DB 260 in association with the URL representing the list screen address in the viewing management DB 260. Details of the process of the registration unit 224 will be described later.

The screen generation unit 225 generates screen data of various screens to be displayed on the buyer terminal 300 or the supplier terminal 400.

The display control unit 226 causes the buyer terminal 300 or the supplier terminal 400 to display the various screens based on the screen data generated by the screen generation unit 225.

The output unit 227 transmits various information to the buyer terminal 300 or the supplier terminal 400. Specifically, for example, the output unit 227 transmits the list screen address to the buyer terminal 300 to enable the buyer terminal 300 to display a list of invoices.

Functions of the buyer terminal 300 and the supplier terminal 400 will be described with reference to FIG. 9.

Figure 9:
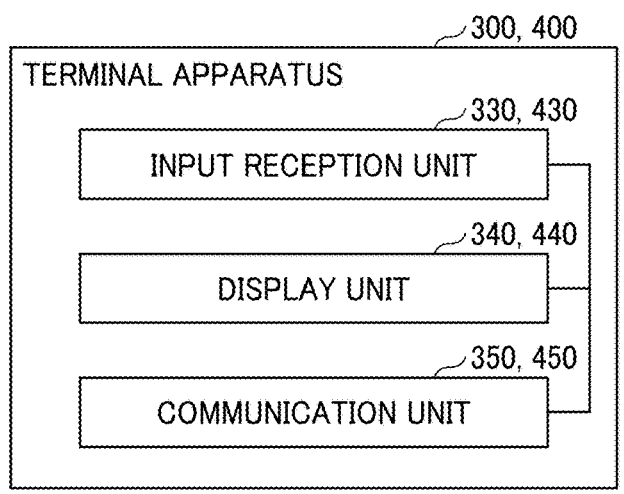
FIG. 9 is a diagram illustrating functions of terminal apparatuses included in the form management system of the first embodiment.

FIG. 9 is a diagram illustrating functions of the buyer terminal 300 and the supplier terminal 400 of the first embodiment. The buyer terminal 300 of the first embodiment includes an input reception unit 330, a display unit 340, and a communication unit 350. Similarly, the supplier terminal 400 of the first embodiment includes an input reception unit 430, a display unit 440, and a communication unit 450.

The input reception unit 330 receives input of an operation or information to the buyer terminal 300. The display unit 340 displays various screens on the buyer terminal 300. The communication unit 350 performs communication of the buyer terminal 300 with the form management apparatus 200.

Similarly, the input reception unit 430 receives input of an operation or information to the supplier terminal 400. The display unit 440 displays various screens on the supplier terminal 400. The communication unit 450 performs communication of the supplier terminal 400 with the form management apparatus 200.

An operation of the form management system 100 of the first embodiment will be described with reference to FIGS. 10A and 10B.

Figure 10B:
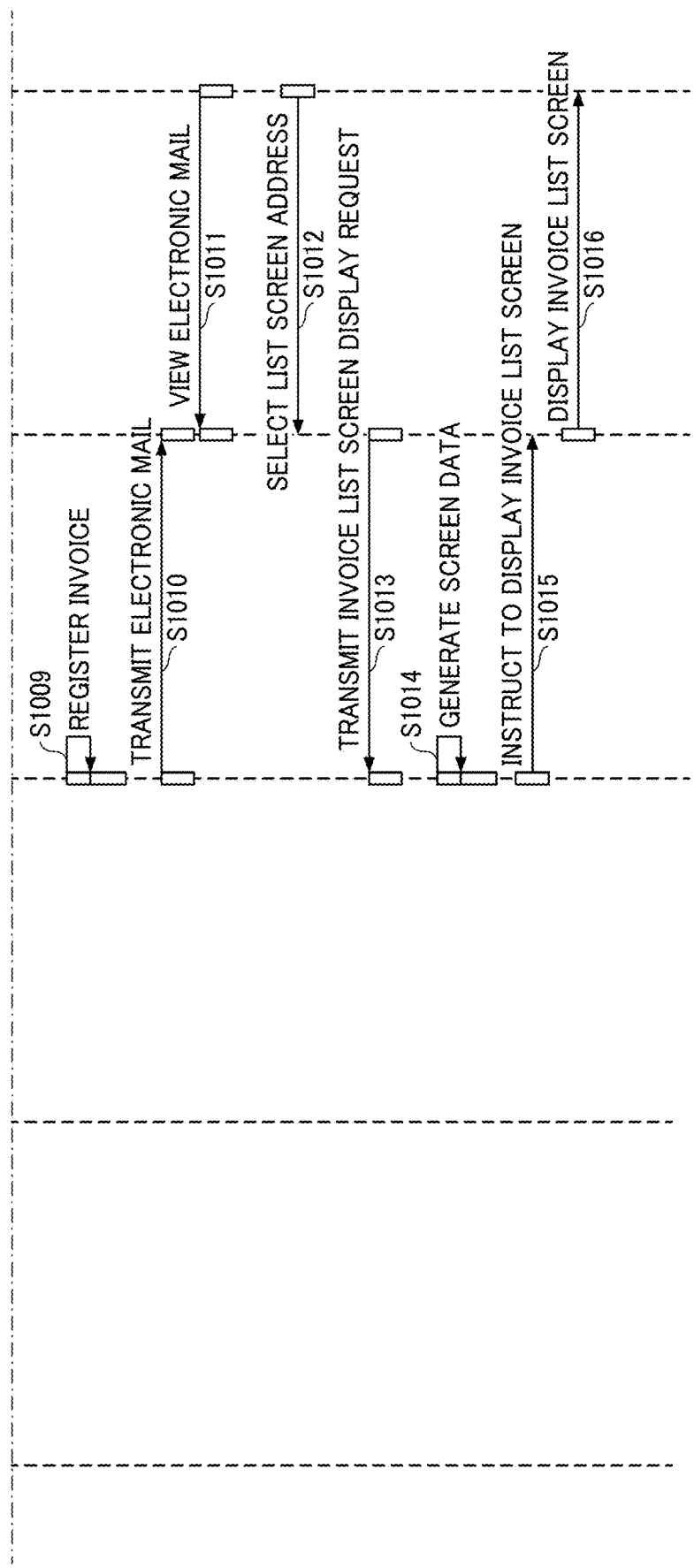

FIGS. 10A and 10B are a sequence diagram illustrating an operation of the form management system 100 of the first embodiment. FIGS. 10A and 10B illustrate an operation of the form management system 100 to enable a supplier user (i.e., supplier tenant) to issue invoices to a buyer user (i.e., buyer tenant) and to enable the buyer user to view the issued invoices displayed in a list.

In the following description with FIGS. 10A and 10B, the buyer user is Corporation A. and the supplier user is B Corporation.

In the form management system 100, the supplier terminal 400 receives user input of the invoice information and an instruction to create the invoice (step S1001), and transmits the input invoice information to the form management apparatus 200 (step S1002).

In the form management apparatus 200, the registration unit 224 stores the invoice information received from the supplier terminal 400 into the invoice DB 250 (step S1003).

Then, in the form management apparatus 200, the screen generation unit 225 generates the screen data for displaying the invoice sending screen, and the display control unit 226 transmits a display instruction to the supplier terminal 400 to display the invoice sending screen (step S1004).

In the supplier terminal 400, in response to receipt of the display instruction, the display unit 440 displays the invoice sending screen (step S1005). The supplier terminal 400 then receives a user operation of registering the invoice in the invoice list (step S1006).

Then, in response to receipt of user specification of the transmission destination of the invoice (step S1007), the supplier terminal 400 transmits an invoice transmission request to the form management apparatus 200 (step S1008).

In the form management apparatus 200, the registration unit 224 stores the invoice in association with the list screen address in the client management DB 240 (step S1009). Details of the process of step S1009 will be described later.

Then, in the form management apparatus 200, the output unit 227 transmits an electronic mail to the buyer terminal 300 specified as the transmission destination (step S1010). This electronic mail contains information of the storage location of (i.e., the link to) the image data of the invoice.

The above-described processes form an operation of transmitting the invoice information from the supplier terminal 400 to the buyer terminal 300. The processes of step S1011 and the subsequent steps may be performed at a time separate from the time of performing the invoice information transmission operation of steps S1001 to S1010.

Then, the buyer user views the received electronic mail on the buyer terminal 300 (step S1011), and the buyer terminal 300 receives user selection of the list screen address included in the electronic mail (step S1012) and transmits an invoice list screen display request to the form management apparatus 200 (step S1013).

In the form management apparatus 200, in response to receipt of the invoice list screen display request, the screen generation unit 225 generates the screen data for displaying the invoice list screen (step S1014). If no error occurs in the process of step S1014, the following processes are performed. Details of the process of step S1014 will be described later.

Then, in the form management apparatus 200, the display control unit 226 transmits a display instruction to the buyer terminal 300 to display the invoice list screen (step S1015).

In the buyer terminal 300, in response to receipt of the display instruction, the display unit 340 displays the invoice list screen (step S1016).

In the first embodiment, when a user operation of confirming the receipt of the invoice and downloading the invoice is received on the invoice list screen displayed on the buyer terminal 300, the form management apparatus 200 may transmit the corresponding invoice information to the buyer terminal 300.

A process of the registration unit 224 of the first embodiment will be described with reference to FIG. 11.

Figure 11:
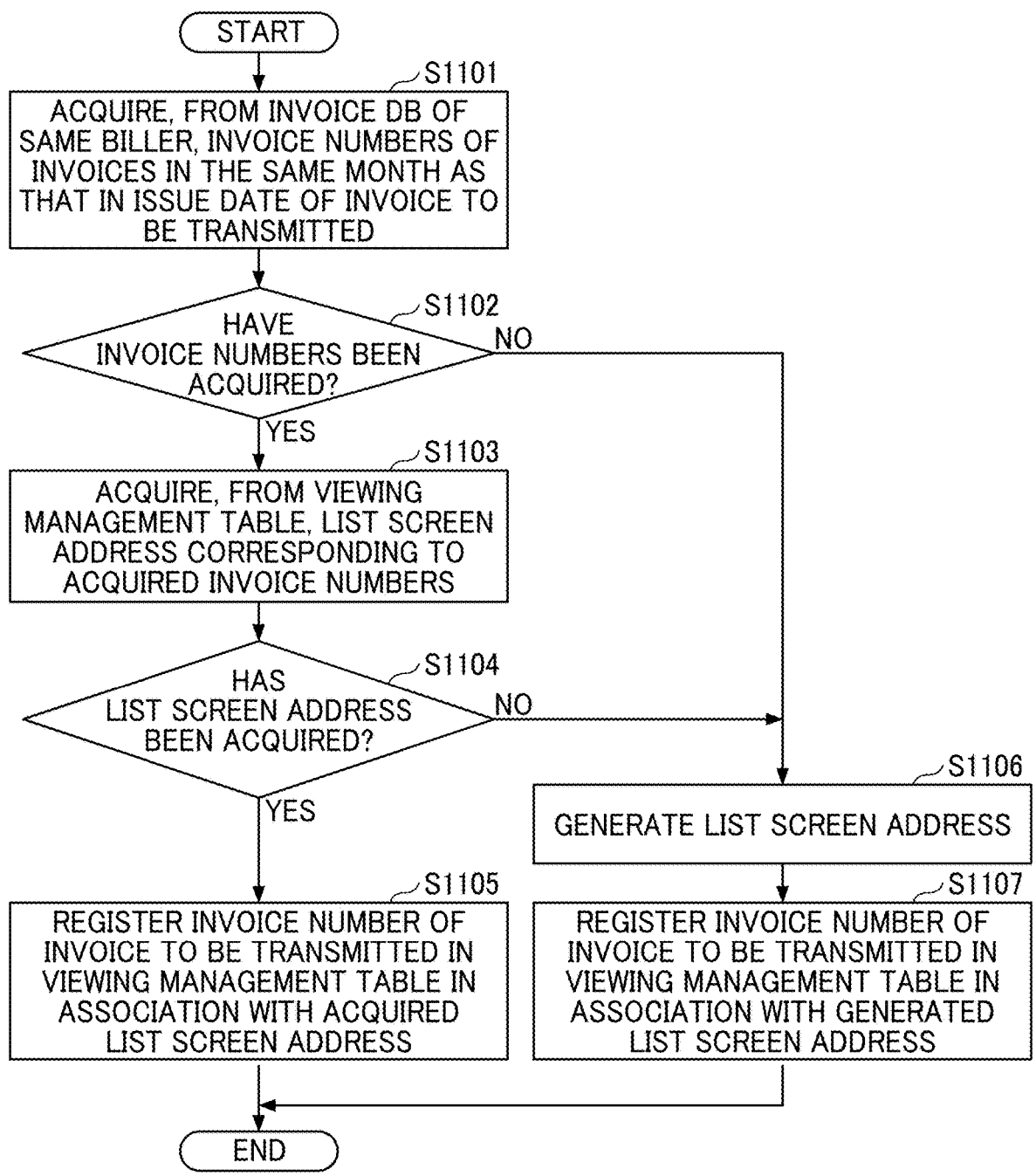
FIG. 11 is a flowchart illustrating a process of the form management apparatus of the first embodiment.

FIG. 11 is a flowchart illustrating a process of the form management apparatus 200. FIG. 11 illustrates details of the process of step S1009 in FIG. 10B.

In the form management apparatus 200 of the first embodiment, in response to receipt of the invoice transmission request, the identification unit 223 of the form management unit 220 identifies, in the invoice DB 250, invoices issued in the same month as that in the issue date of the invoice to be transmitted, and acquires the invoice numbers of the invoice information items corresponding to the identified invoices (step S1101).

Then, the registration unit 224 determines whether the invoice numbers have been acquired (step S1102). If it is determined at step S1102 that the invoice numbers have failed to be acquired (NO at step S1102), the form management unit 220 proceeds to step S1106, which will be described later.

If it is determined at step S1102 that the invoice numbers have been acquired (YES at step S1102), the registration unit 224 refers to the viewing management DB 260 and acquires therefrom the list screen address corresponding to the acquired invoice numbers (step S1103).

Then, the registration unit 224 determines whether the list screen address has been acquired (step S1104). If it is determined at step S1104 that the list screen address has failed to be acquired (NO at step S1104), the form management unit 220 proceeds to step S1106, which will be described later.

If it is determined at step S1104 that the list screen address has been acquired (YES at step S1104), the registration unit 224 registers (i.e., stores), in the viewing management DB 260, the invoice number included in the invoice information representing the invoice to be transmitted in association with the acquired list screen address and the invoice numbers acquired at step S1102 (step S1105). Then, the process of FIG. 11 is completed.

If it is determined at step S1102 that the invoice numbers have failed to be acquired, or if it is determined at step S1104 that the list screen address has failed to be acquired, the registration unit 224 generates a list screen address (step S1106).

Then, the registration unit 224 stores, in the viewing management DB 260, the invoice number included in the invoice information representing the invoice to be transmitted in association with the generated list screen address (step S1107). Then, the process of FIG. 11 is completed. The above-described process is performed by the registration unit 224.

A process of the screen generation unit 225 of the first embodiment will be described with reference to FIG. 12.

Figure 12:
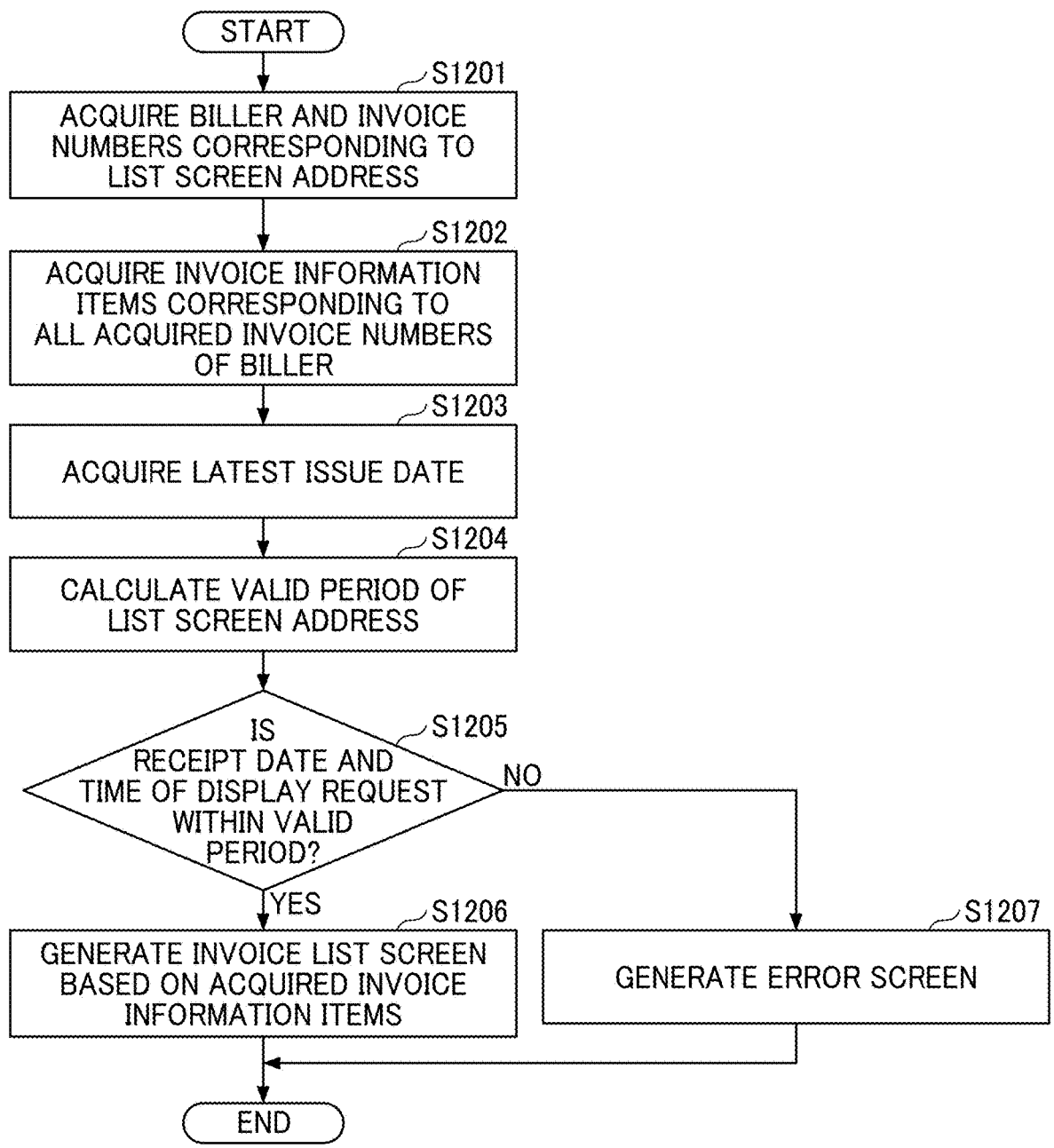
FIG. 12 is a flowchart illustrating another process of the form management apparatus of the first embodiment.

FIG. 12 is a flowchart illustrating another process of the form management apparatus 200. FIG. 12 illustrates details of the process of step S1014 in FIG. 10B.

In the form management apparatus 200 of the first embodiment, in response to receipt of the invoice list screen display request, the screen generation unit 225 of the form management unit 220 refers to the viewing management DB 260 and acquires therefrom the biller and the invoice numbers corresponding to the list screen address (step S1201).

The screen generation unit 225 then acquires, from the invoice DB 250, the invoice information items corresponding to all invoice numbers of the biller (step S1202). Then, the screen generation unit 225 acquires the latest issue date from the acquired invoice information items (step S1203).

The screen generation unit 225 then refers to the viewing period management table 260-2 in the viewing management DB 260, and calculates the valid period of the list screen address based on the issue date acquired at step S1203 (step S1204).

Then, the screen generation unit 225 determines whether the receipt date and time of the request to display the list screen address is within the valid period of the list screen address (step S1205).

If it is determined at step S1205 that the receipt date and time of the request is within the valid period of the list screen address (YES at step S1205), the screen generation unit 225 generates the screen data of the invoice list screen based on the invoice information items acquired at step S1202 (step S1206). Then, the process of FIG. 12 is completed.

If it is determined at step S1205 that the receipt date and time of the request is beyond the valid period of the list screen address (NO at step S1205), the screen generation unit 225 generates screen data for displaying an error screen (step S1207). Then, the process of FIG. 12 is completed.

A display example of the first embodiment will be described with reference to FIGS. 13 to 16.

FIG. 13 is a diagram illustrating an example of an invoice creation screen of the first embodiment. A screen 130 illustrated in FIG. 13 is an example of the invoice creation screen displayed on the supplier terminal 400 at step S1001 in FIG. 10A.

The screen 130 includes a display field 131 and an operation button 132. The display field 131 displays input fields for inputting the invoice information. The operation button 132 is operated to transmit the instruction to create the invoice.

When the invoice information is input in the display field 131 and the operation button 132 is operated on the screen 130, the supplier terminal 400 transitions from the screen 130 to the invoice sending screen.

FIG. 14 is a diagram illustrating an example of the invoice sending screen of the first embodiment. A screen 140 illustrated in FIG. 14 is an example of the invoice sending screen displayed at step S1005 in FIG. 10A.

The screen 140 includes selection fields 141 and 144, display fields 142 and 143, and an operation button 145. The selection field 141 displays a list of electronic mail addresses as candidates for the transmission destination of the invoice information. The transmission destination of the invoice information is selected from the displayed list.

The display field 142 displays an invoice image represented by invoice image data generated based on the invoice information. The display field 143 displays the text of the electronic mail to be transmitted to the buyer terminal 300 in the transmission of the invoice information.

The selection field 144 is used to select the registration of the invoice information corresponding to the invoice image displayed in the display field 142 into the invoice list of the buyer user in the viewing management DB 260. In the example of FIG. 14, the registration of the invoice information into the invoice list of the buyer user is selected in the selection field 144.

When the invoice information corresponding to the invoice image displayed in the display field 142 is transmitted to the form management apparatus 200, therefore, the registration unit 224 stores the invoice number corresponding to the invoice information in the viewing management DB 260 in association with the corresponding list screen address.

The operation button 145 is operated to transmit, via the form management apparatus 200, the text of the electronic mail displayed in the display field 143 to the electronic mail address selected in the selection field 141.

In response to receipt of a user operation of the operation button 145 on the screen 140, the supplier terminal 400 transmits an instruction to the form management apparatus 200 to transmit the invoice information to the transmission destination corresponding to the electronic mail selected in the selection field 141.

Figure 15:
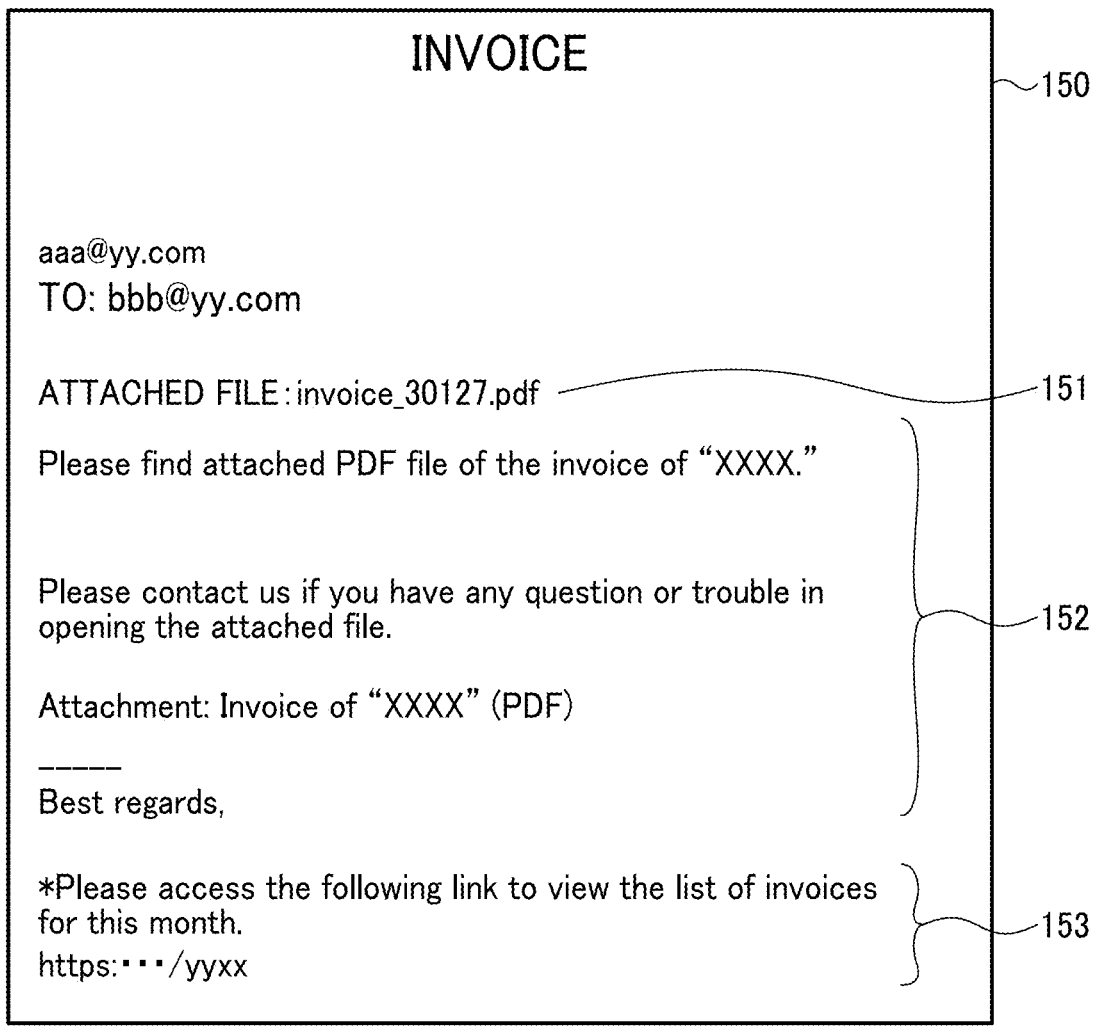
FIG. 15 is a diagram illustrating an example of an invoicing message screen of the first embodiment.

FIG. 15 is a diagram illustrating an example of the invoicing message screen of the first embodiment. A screen 150 illustrated in FIG. 15 is an example of the invoicing message screen displayed on the buyer terminal 300 at step S1011 in FIG. 10B.

The screen 150 includes display areas 151, 152, and 153. The display area 151 displays the file name of the invoice image data representing the invoice image. The display area 152 displays information representing an invoicing message. The display area 153 displays the list screen address (i.e., URL) for displaying the invoice list screen.

In the first embodiment, in response to receipt of a user selection of the list screen address displayed in the display area 153, the buyer terminal 300 transmits the invoice list screen display request to the form management apparatus 200.

In the first embodiment, the invoice list screen display request may include the list screen address and the biller included in the invoice information corresponding to the invoice image.

FIG. 16 is a diagram illustrating an example of the invoice list screen of the first embodiment. A screen 160 illustrated in FIG. 16 is an example of the invoice list screen displayed on the buyer terminal 300 at step S1016 in FIG. 10B. The screen 160 in FIG. 16 is displayed when the invoice list screen display request includes a biller "B Corporation."

The screen 160 includes display fields 161, 162, and 163 and an operation button 164. The display field 161 displays the list screen address. The display field 162 displays the number of invoices displayed in a list in the display field 163 and the total sum of the billing amounts of the invoices.

The display field 163 displays a list of invoices corresponding to the biller "B Corporation." Specifically, the display field 163 displays a partial list of invoice information items corresponding to the biller "B Corporation."

The display field 163 further displays, for each of the invoices, an operation button for displaying the corresponding invoice image on the buyer terminal 300 and an operation button for downloading the corresponding invoice information from the form management apparatus 200. The two operation button are displayed in association with each other. The display field 163 may also display an operation button for transmitting a notification to the form management apparatus 200 to notify that an invoice has been received.

The operation button 164 is operated to batch-download all invoice information items displayed in a list in the display field 163.

The first embodiment thus enables the buyer terminal 300 to display the list of invoice information items having the same biller and the same month in the issue dates thereof, and to batch-download the invoice information items displayed in the list.

The first embodiment therefore obviates the need for the work with the buyer terminal 300 to consolidate the invoices received during a certain period, improving the operational convenience.

Further, in the first embodiment, the valid period is set for the list screen address. Consequently, the invoice information is prevented from being left in a viewable state for an extended period of time; the confidentiality of the invoice information is protected.

A second embodiment of the present invention will be described below with drawings.

The second embodiment is different from the first embodiment in that the unit of the display period of the invoice list is set for each biller.

The following description of the second embodiment will focus on the difference from the first embodiment. The same functional configurations as those of the first embodiment will be denoted with the same reference numerals used in the first embodiment, and description thereof will be omitted.

FIG. 17 is a diagram illustrating an example of a client management DB 240A of the second embodiment. The client management DB 240A of the second embodiment may be provided for each tenant. The client management DB 240A includes information items "tenant name (company name)," "electronic mail address," "contact person," and "unit of period." for example.

The value of the item "unit of period" represents the unit of the period in which the invoices are displayed in a list. In the client management DB 240A for B Corporation in the example of FIG. 17, the unit of the period for a biller "Corporation A" is month. The list of invoices from the biller "Corporation A" is therefore a list of invoices with issue dates having the same month.

Further, in the client management DB 240A for B Corporation in the example of FIG. 17, the unit of the period for a biller "Corporation C" is week. The list of invoices from the biller "Corporation C" is therefore a list invoices with issue dates having the same week.

The second embodiment thus enables the unit of the display period of the invoice list to be set for each biller, thereby enabling the buyer terminal 300 to display the invoice list screen in accordance with the form of sales transaction with the biller.

FIG. 18 is a diagram illustrating an example of a viewing management DB 260A of the second embodiment. The viewing management DB 260A of the second embodiment includes a viewing management table 260A-1 and a viewing period management table 260A-2.

The viewing management table 260A-1 includes information items "list screen address," "status," "payer," "biller," "unit of period," and "invoice number." In the viewing management table 260A-1, the value of the item "unit of period" represents the unit of the period in which the invoices are displayed in a list.

The viewing period management table 260A-2 stores information representing the valid period for each unit of the period. Specifically, in the viewing period management table 260A-2, when the unit of the period is month, the valid period of the list screen address is until the end of the month two months after the issue date. When the unit of the period is week, the valid period of the list screen address is until Friday two weeks after the issue date.

In the second embodiment, the above-described unit of the display period of the invoice list is settable on the invoice sending screen.

FIG. 19 is a diagram illustrating an example of an invoice sending screen of the second embodiment. A screen 140A illustrated in FIG. 19 includes the selection field 141, the display fields 142 and 143, a selection field 144A, and the operation button 145. The selection field 144A is used to select the registration of the invoice information corresponding to the invoice image displayed in the display field 142 into the invoice list of the buyer user in the viewing management DB 260A.

The unit of the display period of the invoice list is selectable in the selection field 144A illustrated in FIG. 19. The example of FIG. 19 indicates that month is selected as the unit of the period in which the invoices from the biller "B Corporation" are displayed in a list.

The second embodiment thus enables the unit of the display period of the invoice list to be set for each biller, thereby enabling the buyer terminal 300 to display the invoice list screen in accordance with the form of sales transaction with the biller.

A third embodiment of the present invention will be described below with reference to drawings.

The third embodiment is different from the first embodiment in that the list screen address is not set differently for each biller.

The following description of the third embodiment will focus on the difference from the first embodiment. The same functional configurations as those of the first embodiment will be denoted with the same reference numerals used in the first embodiment, and description thereof will be omitted.

FIG. 20 is a diagram illustrating an example of a viewing management DB 260B of the third embodiment. It is observed from a viewing management table 260B-1 in the viewing management DB 260B of FIG. 20 that a plurality of billers are associated with a single list screen address. With this configuration, the invoice information of the plurality of billers is displayable on the invoice list screen.

Further, in this case, the client management DB 240 may not be provided for each tenant; the client management DB 240 may be held as a single table.

An invoice list screen of the third embodiment will be described with reference to FIG. 21.

A screen 160A illustrated in FIG. 21 includes display fields 162A and 163A and an operation button 164A.

The display field 163A displays a list of invoices for each of the billers associated with the list screen address. Specifically, the display field 163A includes a partial list of invoice information items corresponding to the biller "B Corporation" and a partial list of invoice information items corresponding to a biller "D Corporation."

The display field 163A may further display, for each of the billers, the total sum of the billing amounts of the invoices displayed in a list.

The display field 163A further displays, for each of the invoices, an operation button for displaying the corresponding invoice image on the buyer terminal 300 and an operation button for downloading the corresponding invoice information from the form management apparatus 200. The two operation button are displayed in association with each other. The display field 163A may also display an operation button for transmitting a notification to the form management apparatus 200 to notify that an invoice has been received. The display field 163A may further display, for each of the billers, an operation button for batch-downloading all invoice information items.

The display field 162A displays the number of invoices displayed in a list in the display field 163A and the total sum of the billing amounts of the invoices.

The operation button 164A is operated to batch-download all invoice information items displayed in a list in the display field 163A.

The third embodiment thus enables the buyer terminal 30) to display the list of invoice information items of invoices with issue dates having the same month out of the invoices issued by a plurality of billers. The third embodiment further enables the buyer terminal 300 to download, for each of the billers, the invoice information items displayed in a list, or to batch-download all invoice information items displayed in a list.

The apparatuses described in each of the embodiments form one of a plurality of computing environments for implementing the embodiment disclosed in the present specification.

In an embodiment of the present invention, the form management apparatus 200 is a server cluster including a plurality of computing devices configured to communicate with each other via a desired type of communication link such as a network or a shared memory, for example, to execute the processes disclosed in the present specification. Similarly, the form management apparatus 200 may include a plurality of computing devices configured to communicate with each other.

Further, the form management apparatus 200 may be configured to share the disclosed process steps with another apparatus in various combinations. For example, a process executed by the form management apparatus 200 may be executed by another server. Similarly, a function of the form management apparatus 200 may be executed by another server. Further, the components of the form management apparatus 200 and the components of another server may be integrated in a single server, or may be distributed to a plurality of apparatuses.

The correspondence tables described in the present specification may be generated as a result of machine learning. Further, if keywords and account items that may be included in a transaction description are categorized by machine learning, it is unnecessary to use the correspondence tables.

Herein, machine learning refers to a technology for causing a computer to acquire learning ability similar to human learning ability. According to the technology, the computer autonomously generates, from previously learned data, algorithms for making decisions such as data identification, and makes predictions by applying the algorithms to new data. The learning method for machine learning may be any of supervised learning, unsupervised learning, semi-supervised learning, reinforcement learning, and deep learning, or may be a combination of two or more of these learning methods. The learning method for machine learning is not limited to a particular method.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus, comprising: circuitry configured to
register a plurality of forms issued to a particular party and an address, the plurality of forms and the address being registered in association with each other;
receive a list screen display request from a terminal;
acquire invoice information corresponding to the address, the invoice information associating a biller and invoice numbers corresponding to the address;
calculate a valid period of the address based on an issue date of the invoice information;
generate screen data based on the invoice information and in a case that a receipt date and time of the list screen display request is within the valid period of the address, the screen data including a list screen, and the list screen including a list of invoices for the particular party at the address;
generate the screen data including an error message in a case that the receipt data and time of the list screen display request is not within the valid period of the address: and
transmit the screen data to the terminal with an instruction to the terminal to display a screen corresponding to the screen data.

2. The information processing apparatus of claim 1, wherein the circuitry is further configured to
identify a form information item, of a plurality of form information items each representing a form and being stored in a memory, that meets a preset condition, and register the identified form information item and the address in association with each other.

3. The information processing apparatus of claim 2, wherein the circuitry identifies, as the form information item meeting the preset condition, a form information item representing a form having an issue date within a preset period.

4. The information processing apparatus of claim 2, wherein the circuitry identifies, as the form information item meeting the preset condition, a form information item representing a form issued by a particular issuer.

5. The information processing apparatus of claim 1, wherein the circuitry is further configured to output information including the address to a destination previously registered in association with the particular party.

6. An information processing system, comprising:
a first terminal apparatus;
a second terminal apparatus; and
an information processing apparatus including circuitry configured to
register a plurality of forms issued in response to an operation of the second terminal apparatus and an address, the plurality of forms and the address being registered in association with each other;
receive a list screen display request from the first terminal apparatus:
acquire invoice information corresponding to the address, the invoice information associating a biller and invoice numbers corresponding to the address;
calculate a valid period of the address based on an issue date of the invoice information;
generate screen data based on the invoice information and in a case that a receipt date and time of the list screen display request is within the valid period of the address, the screen data including a list screen, and the list screen including a list of invoices for the particular party at the address;
generate the screen data including an error message in a case that the receipt data and time of the list screen display request is not within the valid period of the address; and
transmit the screen data to the first terminal apparatus with an instruction to the first terminal apparatus to display a screen corresponding to the screen data, wherein
the first terminal apparatus includes a display to display the screen data.

7. The information processing system of claim 6, wherein the information processing apparatus further includes a memory that stores a plurality of form information items each representing a form, and
the circuitry is further configured to
identify a form information item, of the plurality of form information items. that meets a preset condition, and
register the identified form information item and the address in association with each other.

8. The information processing system of claim 7, wherein the circuitry identifies, as the form information item meeting the preset condition, a form information item representing a form having an issue date within a preset period.

9. The information processing system of claim 7, wherein the circuitry identifies, as the form information item meeting the preset condition, a form information item representing a form issued by a particular issuer.

10. The information processing system of claim 6, wherein the circuitry outputs information including the address to a destination previously registered in association with the particular party.

11. An information processing method, comprising:
registering a plurality of forms issued to a particular party and an address, the plurality of forms and the address being registered in association with each other;
receiving a list screen display request from a terminal;
acquiring invoice information corresponding to the address, the invoice information associating a biller and invoice numbers corresponding to the address;
calculating a valid period of the address based on an issue date of the invoice information;
generating screen data based on the invoice information and in a case that a receipt date and time of the list screen display request is within the valid period of the address, the screen data including a list screen, and the list screen including a list of invoices for the particular party at the address;
generating the screen data including an error message in a case that the receipt data and time of the list screen display request is not within the valid period of the address; and
transmitting the screen data to the terminal with an instruction to the terminal to display a screen corresponding to the screen data.

12. The information processing method of claim 11, further comprising:
identifying a form information item, of a plurality of form information items each representing a form and being stored in a memory, that meets a preset condition; and
registering the identified form information item and the address in association with each other.

13. The information processing method of claim 12, wherein the form information item meeting the preset condition is a form information item representing a form having an issue date within a preset period.

14. The information processing method of claim 12, wherein the form information item meeting the preset condition is a form information item representing a form issued by a particular issuer.

15. The information processing method of claim 12, further comprising:
outputting information including the address to a destination previously registered in association with the particular party.

* * * * *